United States Patent [19]

Schmidt, deceased et al.

[11] 4,036,661
[45] July 19, 1977

[54] ASPHALT MINERAL AGGREGATE COMPOSITIONS CONTAINING SILANES AS ADHESION PROMOTERS

[75] Inventors: Robert J. Schmidt, deceased, late of El Cerrito, Calif.; Peter E. Graf, Orinda, Calif.

[73] Assignee: Chevron Research Company, San Francisco, Calif.

[21] Appl. No.: 331,424

[22] Filed: Feb. 12, 1973

[51] Int. Cl.² .................. C08L 95/00; C09D 3/24
[52] U.S. Cl. ................. 106/273 N; 106/277; 106/281 N
[58] Field of Search ............ 106/273 N, 277, 287 SB, 106/281 N; 260/448.2, 448.8

[56] References Cited
U.S. PATENT DOCUMENTS

| | | | |
|---|---|---|---|
| 2,570,185 | 10/1951 | Aldrich | 106/273 N |
| 3,108,971 | 10/1963 | Mertens | 106/277 X |
| 3,861,933 | 1/1975 | Doi | 106/273 N |

FOREIGN PATENT DOCUMENTS

| | | | |
|---|---|---|---|
| 800,685 | 11/1950 | Germany | 106/277 |

*Primary Examiner*—Joseph L. Schofer
*Assistant Examiner*—Herbert J. Lilling
*Attorney, Agent, or Firm*—C. J. Tonkin; J. T. Brooks

[57] ABSTRACT

Surfacing compositions are provided which comprise a mixture of mineral aggregate, asphalt and a silane of the formula:

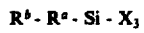

$$R^b - R^a - Si - X_3$$

wherein (a) X represents halogen or alkoxy, (b) $R^a$ represents alkylene and (c) $R^b$ represents amino, aminoalkylene amino, gamma-glycidoxy, hydrocarbyl, acyloxy or mercapto.

11 Claims, No Drawings

ASPHALT MINERAL AGGREGATE COMPOSITIONS CONTAINING SILANES AS ADHESION PROMOTERS

BACKGROUND OF THE INVENTION

1. Field of the Invention

The present invention relates to asphalt surfacing compositions and more particularly to compositions for use in paving construction, which compositions have improved adhesion of the asphalt binder to the mineral aggregate. The improved adhesion is obtained by including in the surfacing composition a silane as described herein below. The silane may be added either to the asphalt or to the mineral aggregate prior to mixing. The compositions show a surprising increase in the adhesion of the binder to the mineral aggregate even when completely immersed in water for extended periods.

2. DESCRIPTION OF THE PRIOR ART

A wide variety of silicon compounds including silanes have been used for the impregnation and surface treatment of glass fibers to promote the adhesion of various organic resins such as the polyester resins, epoxide resins or phenol formaldehyde resins and for the surface treatment of textiles, leathers, ceramics and glass materials.

It has been found that the adhesion of asphalt to siliceous aggregates could be markedly improved by first treating the aggregate with vapors of a mixture of methylchlorosilanes. However, this exotic method of application of the silanes to the aggregate is not practical in large scale applications. Sanderson, F. C., "Methylchlorosilanes as Anti-stripping Agents". Proceedings, Highway Research Board, 31, 288 (1952).

U.S. Pat. No. 2,570,185 (106–273) issued Oct. 9, 1951 discloses that the reaction product of aminoalkoxysilanes and high molecular weight aliphatic primary amines containing at least 6 carbon atoms may be added to asphalt to improve the coating properties and anti-stripping properties of the asphalt. The only example of a silane shown in this reference is di-t-butoxy-diamino silane. U.S. Pat. No. 2,985,678 (260–448.8) issued May 23, 1961 discloses that higher alkyl or aryl radicals in silicon compounds progressively lower the stability of the compounds. However, the tertiary butyl radical is shown to increase the stability of the silicon compounds, even in silicon compounds which contain long chain alkyl such as lauryl group.

German Pat. No. 800,685 teaches silanes as asphalt adhesion agents. The useful silanes are said to be of the formula $SiR_mS_n$ wherein X represents a halogen or an alkoxy, R represents an organic residue and $m$ and $n$ represent integers of from 1 to 3. Specific examples of R include methyl, phenyl and 2-chloroethylene.

The patent literature, particularly class 106, subclasses 273 and 277 is replete with attempts to improve the adhesion of asphalt binders to mineral aggregate. The patent literature referring to silicon compound chemistry continually is concerned with the thermal stability of silicon compounds. Thus it may be seen it is highly desirable compounds of any type be found which not only promote the adhesion of asphalt to mineral aggregate but also remain stable over a wide temperatue range and for an extended period. In addition to this it is highly desirable that the adhesion promoters be capable of being used without exotic application methods. Preferably the promoter should be susceptible of introduction into the asphalt in the molten state or application to the mineral aggregate prior to mixing with the asphalt or both.

SUMMARY OF THE INVENTION

It is now found that particular trihalo and trialkoxy silanes are useful for promoting the adhesion of asphalt to mineral aggregate. These silanes are susceptible of introduction into asphalt-mineral aggregate surfacing compositions at any stage of their preparation. Furthermore, these silanes increase the quantity of asphalt retained on the aggregate after severe hot water stripping tests. Typically, a ten to twentyfold increase in retained asphalt is found compared to the results with conventional anti-stripping agents.

In brief, the surfacing compositions of the invention comprise (A) a mineral aggregate, (B) an asphalt, and (C) a trihalo or trialkoxy silane of the formula set forth below.

DETAILED DESCRIPTION OF THE INVENTION

The surfacing compositions of this invention in which the adherence of the asphalt to the mineral aggregate is substantially increased comprise: (A) 100 parts by weight of a mineral aggregate; (B) from 3 to 20 parts by weight of an asphalt and (C) from 0.0001 to 0.10 part by weight of a silane of the formula:

$$R^b\text{-}R^a\text{-}Si\text{-}X_3 \qquad (I)$$

The Mineral Aggregate

The particular mineral aggregates used to form the surfacing compositions of this invention are not critical. They may be siliceous in nature, e.g. granite and the like or calcareous in nature; e.g., limestone and the like or mixtures thereof.

The Asphalt

A wide variety of asphalts may be used to prepare the surfacing compositions of the subject invention. In general, any paving grade asphaltic binder satisfactory for preparing paving compositions is contemplated as being useful in the subject invention. Paving grade asphalts can have a wide range of penetration values ranging from as low as 30 or 40 dmm for the harder asphalts to 200 to 300 dmm at 77° F (100 g, sec.) for the softer asphalts. The most widely used paving asphalts generally have a penetration at 77° F of about 50–60 or 60–70 dmm.

The Adhesion Promoters

The adhesion promoters used in the preparation of the sufacing compositions of this invention are the trihalo, or trialkoxy silanes of formula I above.

In formula I above:

a. X represents halogen, e.g., flourine, chlorine, bromine and the like, preferably chlorine, or alkoxy containing 1 to 4 carbon atoms, e.g., methoxy, ethoxy, propoxy, isopropoxy, butoxy, isobutoxy, sec-butoxy, tert-butoxy;

b. $R^a$ represents alkylene preferably containing 2 to 4 carbon atoms, e.g., ethylene, trimethylene, methylethylene, alpha-methyl trimethylene, beta-methyl trimethylene, tetramethylene, and the like;

c. $R^b$ represents amino; aminoalkylene amino, preferably containing 1 to 3 carbon atoms, e.g., amino methylene amino, aminoethylene amino, aminotrimethylene amino, aminoethylethylene amino; gamma-glycidoxy, hydrocarbyl, preferably containing from 12 to 19 carbon atoms, e.g., dodecyl, tridecyl, tetradecyl, pentadecyl, hexadecyl, heptadecyl, octadecyl, nonadecyl, and the like; acyloxy, preferably containing 2 to 4 carbon atoms, e.g., ethanoyloxy, propanoyloxy, butanoyloxy, 2-butenoyloxy, and the like; or mercapto.

The silanes are present in the surfacing composition in an amount effective to substantially increase the amount of asphalt remaining on the aggregate after the water immersion test described below. By substantially, is meant at least 10 percent and preferbly at least 50 percent relative to the amount of asphalt coating aggregate in surfacing compositions not containing an adhesion promoter. In general, the amount of silanes necessary to substantially increase the asphalt coating the aggregate after the stripping test will range from about 0.0001 part to about 0.10 part by weight per 100 parts of mineral aggregate present in the surfacing composition. Preferably, the silanes are present in amounts ranging from about 0.0005 to about 0.05 party by weight per 100 parts of mineral aggregate.

The silanes can be introduced into the surfacing compositions in a variety of ways during the manufacture of the surfacing compositions.

The silanes can be added to molten asphalt prior to mixing with the aggregate. When added in this manner the concentration of the silane in the asphalt must be adjusted such that the proper concentration is obtained when the asphalt is mixed with the aggregate. Typically, the silanes will be present in the asphalt in from about 0.001 to about 1.0 percent weight preferably 0.005 to about 0.5 percent weight.

Another method is to pretreat the aggregate with the silane prior to addition of the emulsion. Since very small quantities of silane are used relative to the aggregate, the silane is most conveniently added to the aggregate in the form of a solution. Suitable solvents include water and most of the inert liquid hydrocarbon solvents which are compatible and nonreactive with the silane. Examples include benzene, toluene, xylene, pentane and the like. There are a number of limitations attendant to the pretreatment of the aggregate with a hydrocarbon solution of the silane. These include the requirement that the aggregate be moderately dry during silane application. Second, the presence of the volatile solvent represents both an air pollution problem and a fire hazard. For greatest economy and ease of handling, the preferred solvent for silane pretreatment of the aggregate is water. Most conveniently, the silane is dissolved in the water and the solution applied to the aggregate prior to drying.

Other Materials

In addition to the above mentioned ingredients of the surfacing compositions of the invention, a number of other materials can be present. These can include materials which affect the physical properties of the asphalt in the finished surface composition, such as addivites which improve the high and low temperature characteristics of the asphalt.

In general, any additives which have been used in the prior art to improve the resulting surfacing compositons and which are compatible with the silanes can be added to the surfacing compositions of this invention. The selection and use of these additives is not a part of this invention and such matters are well within the purvue of those skilled in the art. The testing of the compatibility of proposed additives with the silanes used in this invention is straightforward and easily conducted.

Small samples can be prepared and tested by the water immersion test described below as well as other standard tests used to determine the properties of asphaltic type surfacing compositions.

The Surfacing Compositions

The surfacing compositions of the invention ar prepared by mixing together, in the proportions indicated above, the mineral aggregate, the asphalt, and the silane. For best results, the components are preferably intimately mixed to obtain a uniform distribution of the asphalt and silane onto the surface of the mineral aggregate.

TEST OF ASPHALT-AGGREGATE ADHESION

General Procedure for Sample Preparation and Water Immersion Testing (Stripping Resistance)

Surfacing compositions are prepared by mixing 5 parts of a paving asphalt with 100 parts of aggregate. Prior to mixing, both the asphalt and aggregate are heated to 325° F. Unless otherwise indicated, the mixture is cured for 15 minutes at 275° F., redispersed to assure completeness of coating, and allowed to cool to room temperature. Following the prescribed cure, the samples are subjected to water immersion. Typically, a variety of immersion conditions are investigated. These can include a short exposure in boiling water, typically one or two minutes; longer exposures at room temperature, and 140° F and 180° F for 1, 4 and 8 days and 3 months. The percent coating remaining on the aggregate at completion of the water immersion test is rated visually on a scale of 0-100%. For purposes of quality control one or more of the above conditions are often omitted and only the boiling water test is conducted.

In the following examples, all parts are parts by weight unless otherwise expressed.

EXAMPLE I

Effect of Silane Concentration

A paving grade asphalt (50/60 penetration at 77° F) was prepared to contain from 0.002% W to 1.0% W of 3-{N-(2-aminoethyl)amino}propyltrimethoxysilane. This asphalt (5 parts) was mixed with a Bristol silica stone (100 parts) graded such that 100% passes a 3/8 inch U.S. standard sieve and 100% is retained on an 1/4 inch U.S. standard sieve. The mixture then contains 1 ppm to 500 ppm relative to the aggregate. The mixtures were cured for 15 minutes either at 275° F or 325° F and then allowed to cool to room temperature after which water immersion tests were made. The results are shown in Table I.

TABLE I

| Immersion | | Cure | Silane Concentration Relative to Aggregate, ppm | | | | | |
|---|---|---|---|---|---|---|---|---|
| Time | Temp | Temp | 0 | 1 | 5 | 50 | 250 | 500 |
| 2 min | Boiling Water | 275 | 25 | — | 90 | 100 | 100 | 100 |
| | | 325 | 30 | 95 | 100 | 100 | 100 | 100 |
| 1 day | 140° F | 275 | 10 | — | 85ᵃ | 100 | 100 | 100 |
| | | 325 | 10 | — | 95 | 100 | 100 | 100 |
| 4 days | 140° F | 275 | 5 | — | 80 | 95 | 95 | 100 |
| | | 325 | 10 | 90 | 95 | 100 | 100 | 100 |
| 8 days | 140° F | 275 | 5 | — | 85 | 95 | 95 | 100 |
| | | 325 | 5 | 80 | 95 | 100 | 100 | 100 |
| 1 day | 180° F | 275 | 5 | — | 70 | 100 | 100 | 100 |
| | | 325 | 5 | — | 80ᵃ | 100 | 100 | 100 |
| 4 days | 180° F | 275 | 5 | — | — | 80ᵇ | 80ᵇ | — |
| | | 325 | 5 | 30 | 50 | 85ᵇ | 100ᵇ | 100ᵇ |
| 8 days | 180° F | 275 | 2 | — | 20 | 30ᵇ | 30ᵇ | 30ᵇ |
| | | 325 | 2 | 20 | 40ᵇ | 75ᵇ | 90 | 100 |

ᵃCoating thins rather strips off
ᵇRocks retain black coating but extremely thin in places due to flow of asphalt, i.e., adhesive strength is greater than cohesive strength As little as 1 ppm silane relative to the aggregate was effective in giving a tenfold increase in asphalt retained on the stone compared to results obtained without silane, even under the conditions of the very severe 8-day, 180° F water immersion test. It may also be noticed that in most cases, higher cure temperatures gave better results.

EXAMPLE II

Effect of Silane Concentration and Long-Term Curing of Mixes at Elevated Temperatures Bristol silica stone graded as in Example I was pretreated with benzene solutions of the same silane and dried to leave 8, 20 and 40 ppm silane on the stone. Mixes of the pretreated stone and the same asphalt were prepared. They were cured 14 minutes at 275° F, 18 hours at 200° F and then 3 hours as indicated in Table II after which water immersion tests were made. The results are also shown in Table II.

EXAMPLE III

Effect of Silane on Long-Term Immersion

Asphalt-aggregate mixes were prepared as in Example I such that they contained 0, 1, 5 and 50 ppm silane relative to the aggregate. After three months' immersion at 140° F, coating retentions of about 0, 50, 80 and 100 percent, respectively, were observed. Samples immersed at room temperature for 3 months retained only 80–90% of their coating without the silane. Samples in which the aggregate was pretreated with 8 ppm silane retained more than 90% of their coating.

EXAMPLE IV

High Temperature Stability of Silane Preblended in Asphalt

Asphalts containing 0.1, 0.5 and 1.0% W silane of Example I were prepared and stored at 275° F and 325° F. Portions of the treated asphalt stored at these temper-

TABLE II

PERCENT COATING AFTER IMMERSION AS A FUNCTION OF SILANE CONCENTRATION AND CURING TEMPERATURE

| Immersion Temperature | | 70° F | | | | 140° F | | | | 180° F | | | | Boiling Water | | | |
|---|---|---|---|---|---|---|---|---|---|---|---|---|---|---|---|---|---|
| Immersion Time | Cure Temp.,° F | \multicolumn{16}{c}{Concentration Silane - Relative to Aggregate, ppm} |
| | | 0 | 8 | 20 | 40 | 0 | 8 | 20 | 40 | 0 | 8 | 20 | 40 | 0 | 8 | 20 | 40 |
| 1-Day | 325 | 100$^a$ | 100$^a$ | 100$^a$ | 100$^a$ | 95 | 95 | 95 | 90$^b$ | 95$^c$ | 95$^c$ | 95$^c$ | 95$^c$ | 100 | 100 | 100 | 100 |
| | 275 | 100$^a$ | 100$^a$ | 100$^a$ | 100$^a$ | 20 | 100 | 100 | 100 | 5$^c$ | 95$^c$ | 95$^c$ | 95$^c$ | 70 | 100 | 100 | 100 |
| | 200 | 100$^a$ | 100$^a$ | 100$^a$ | 100$^a$ | 5 | 95$^b$ | 95$^b$ | 98$^b$ | 5 | 85 | 90 | 90 | 20d | 95 | 95 | 95 |
| 3-Day | 325 | 100$^a$ | 100$^a$ | 100$^a$ | 100$^a$ | 95$^f$ | 100 | 100 | 95 | 80$^g$ | 100$^g$ | 100$^g$ | 100$^g$ | | | | |
| | 275 | 100$^a$ | 100$^a$ | 100$^a$ | 100$^a$ | 15 | 95 | 95 | 95 | 5 | 90 | 95 | 95 | | | | |
| | 200 | 100$^a$ | 100$^a$ | 100$^a$ | 100$^a$ | 5 | 95 | 90 | 95 | 5 | 80 | 90 | 95 | | | | |

$^a$Coating slightly wrinkled but coherent
$^b$Many small collapsed blisters; coating still continuous
$^c$Dull, slightly waxy coating; a few collapsed (but coherent) "blisters"
$^d$A few collapsed, closed "blisters"; coating continuous
$^e$Slight wrinkling but glossy, coherent black surface
$^f$Slight waxy coating
$^g$Very dull, waxy, brownish cast; scratched easily to black, coherent coating In most cases, the silane markedly increased the amount of asphalt remaining on the treated aggregate relative to the untreated aggregate. Little or no difference was expected or observed at the 70° F immersion temperature. Under these mild conditions, differences would be expected only after longer immersion periods.

atures for 1 to 8 days were used to prepared mixes with silica stone as described in the general test description above. Immersion tests in boiling water and at 140° F for one and four days were made. The results are shown in Table IV.

TABLE IV

| | | | \multicolumn{11}{c}{Silane Concentration Relative to Aggregate, ppm} |
|---|---|---|---|---|---|---|---|---|---|---|---|---|---|
| | | Asphalt | \multicolumn{5}{c}{0} | \multicolumn{6}{c}{50} |
| | | Storage | \multicolumn{11}{c}{Additive-Asphalt Storge Period, Days} |
| Time | Temp | Temp | 1 | 2 | 3 | 4 | 8 | 1 | 2 | 3 | 4 | 8 | 1 |
| 2 Min | Boiling Water | Room Temp | 5 | — | 10 | 10 | 15 | 100 | — | 100 | — | 100 | 100 |
| | | 275 | 10 | 15 | 10 | 10 | 15 | 95 | 60 | 20 | 30 | 80 | 100 |
| | | 325 | 15 | 15 | 10 | 10 | 15 | 80 | 60 | 40 | 30 | 85 | 100 |
| 1 Day | 140° F | R.T. | 5 | — | 10 | — | 5 | 95 | — | 100 | — | 100 | 100 |
| | | 275 | 5 | 5 | 10 | 5 | 5 | 90 | 40 | 25 | 20 | 95 | 100 |
| | | 325 | 5 | 10 | 10 | 5 | 5 | 50 | 20 | 20 | 20 | 90 | 95 |
| 4 Days | 140° F | 275 | | | | 2 | | | | | | 5 | |
| | | 325 | | | | 2 | | | | | | 5 | |

| | | | \multicolumn{9}{c}{Silane Concentration Relative to Aggregate, ppm} |
|---|---|---|---|---|---|---|---|---|---|---|---|
| | | Asphalt | \multicolumn{4}{c}{250} | \multicolumn{5}{c}{500} |
| | | Storage | \multicolumn{9}{c}{Additive-Asphalt Storage Period, Days} |
| Time | Temp | Temp | 2 | 3 | 4 | 8 | 1 | 2 | 3 | 4 | 8 |
| 2 Min | Boiling Water | Room Temp | — | 100 | — | 100 | 100 | — | 100 | — | 100 |
| | | 275 | 95 | 95 | 100 | 90 | 100 | 100 | 100 | 100 | 85 |
| | | 325 | 90 | 90 | 70 | 95 | 100 | 95 | 95 | 95 | 95 |
| 1 Day | 140° F | R.T. | — | 100 | — | 100 | 100 | — | 100 | — | 100 |
| | | 275 | 100 | 95 | 95 | 80 | 100 | 75 | 10 | 100 | 100 |
| | | 325 | 90 | 85 | 90 | 100 | 100 | 95 | 100 | 95 | 100 |
| 4 Days | 140° F | 275 | | | 95 | | | | | 100 | |
| | | 325 | | | 50 | | | | | 100 | |

EXAMPLE V

A variety of silanes were tested for their effectiveness as adhesion promoters. The silane was added to the paving grade asphalt used in Example I at treatment levels of 0.02, 0.1 and 0.5% W. Five parts of the treated asphalt was mixed with 100 parts of the silica aggregate of Example I, cured, and water immersion tested according to the general procedure described above. The silanes tested, treatment levels relative to the aggregate, immersion conditions and results are shown in Table V.

ciently to ensure thorough dispersion of the glass fiber in the mass. The asphalt heated to not more than 425° F is added to the mass and mixed to ensure complete dispersion in the mass. The temperatures of the aggregate and asphalt are controlled to yield a mastic mix having a temperature between 280° and 400° F. The mixture is formed into a cylinder four inches in diameter and two-and-one-half inches tall. The resilient modulus ($M_R$) of the sample is determined dry. See Schmidt, R. J., "A Practical Method of Measuring the Resilient Modulus of Asphalt-Treated Mixes." Highway Research Record No. 404, Highway Research Board,

TABLE V

EFFECTS OF VARIOUS SILANE ADHESION AGENTS ON PERCENT ASPHALT COATING RETAINED ON SILICA AGGREGATE AFTER DIFFERENT IMMERSION PERIODS IN WATER

| | Test Immersion Conditions | Boiling Water | | | 140° F/1 Day | | | 140° F/6 Days | | | 140° F/3 Months | | |
|---|---|---|---|---|---|---|---|---|---|---|---|---|---|
| No. | Additive Concentration Relative to Aggregate, ppm | 250 | 50 | 10 | 250 | 50 | 10 | 250 | 50 | 10 | 250 | 50 | 10 |
| 1 | 3-{N-(2-aminoethyl)amino}propyl-trimethoxysilane | 100 | 100 | 100 | 100 | 100 | 100 | 100 | 100 | 100 | 100 | 100 | 100 |
| 2 | gamma-glycidoxypropyltrimethoxysilane | 100 | 100 | 100 | 100 | — | 100 | 100 | 100 | 100 | 100 | 100 | 100 |
| 3 | Octadecyltrichlorosilane | 100 | 100 | 100 | 90 | 70 | 90 | 90 | 50 | 50 | 80 | 50 | 30 |
| 4 | gamma-Aminopropyltriethoxysilane | 100 | 100 | 50 | 100 | 100 | 20 | 100 | 100 | 20 | 100 | 90 | 20 |
| 5 | gamma-Methacryloxypropyltrimethoxysilane | 100 | 100 | 50 | 100 | 80 | 10 | 100 | 90 | 10 | 100 | 90 | 10 |
| 6 | gamma-Mercaptopropyltrimethoxysilane | 100 | 60 | 60 | 100 | 60 | 10 | 100 | 60 | 10 | 100 | 60 | 10 |
| 7 | Vinyltriethoxysilane | 90 | 50 | 30 | 90 | 50 | 20 | 90 | 20 | 5 | 50 | 10 | 10 |
| 8 | Phenyltriethoxysilane | 90 | 50 | 40 | 90 | — | 10 | 10 | 10 | 5 | 30 | 5 | 5 |
| 9 | n-Propyltrichlorosilane | 100 | 100 | 40 | 60 | 50 | 20 | 40 | 10 | 5 | 20 | 10 | 5 |
| 10 | Ethyltriethoxysilane | 50 | 50 | 5 | 60 | 20 | 5 | 20 | 5 | 5 | 20 | 10 | 5 |
| 11 | Control | 10 | — | — | 10 | — | — | 5 | — | — | 5 | — | — |

The above data demonstrate the effectiveness of the silanes in improving adhesion in the compositions of the invention. It may be observed that silanes similar to those used in the prior art (see Nos. 8 and 10) yield vastly inferior compositions.

EXAMPLE VI

Mastic compositions for coating steel pipe used in underground and underwater pipeline installations were prepared. Components of the mastic are sand (622 parts) having a gradation of 49.7% W of 8 × 16 mesh, 25.6% W of 16 × 30 mesh, 15.2% W of 30 × 50 mesh, 6.3% W of 50 × 100 mesh, 1.6% W of 100 × 200 mesh and 1.6% W of less than 200 mesh, limestone dust (264 parts), fiberglass, 1.3 parts, and asphalt (58) parts) having a softening point of 197.5° F and a penetration of 18 at 77° F.

The sand and limestone are heated to not more than 450° F. The glass fiber, chopped to one-fourth inch filament lengths is willowed and added to the aggregate. The aggregate and glass fiber are mixed suffi-

1972.

The sample is saturated with water under vacuum and the resilient modulus is determined again after 30 days' water immersion at room temperature.

Samples in which both the sand and limestone or sand only were pretreated to have a residue of 0.03% W of the silane of Example I were also prepared and tested as described. The results are shown in Table VI.

TABLE VI

| No. | Fiber[1] | Fiber[2] Treatment | Aggregate Treatment | Resilient Modulus ($M_R$) × $10^5$, psi | | Percent MR Retained After 60 Days |
|---|---|---|---|---|---|---|
| | | | | Dry | 60 Days Saturated | |
| 1 | 4153 | Silane | — | 8.32 | 2.95 | 35 |
| 2 | 851 | Silane | — | 9.76 | 3.79 | 39 |
| 3 | 588-37 | Starch | — | 9.90 | 3.40 | 35 |
| 4 | 415 | Silane | Silane | 6.16 | 3.89 | 63 |
| 5 | 851 | Silane | Silane | 11.34 | 7.79 | 69 |
| 6 | 415 | Silane | Silane-sand only | 8.70 | 6.39 | 73 |
| 7 | 851 | Silane | " | 11.13 | 6.77 | 61 |

[1]Available from Owens Corning
[2]Fiberglass is given a surface treatment of a silane or starch to prevent scoring during handling
[3]1.7 parts used instead of 1.3 parts The above data demonstrate that the silane treatment of the fiberglass has essentially no effect on the water resistance of the mastic composition. However, silane treatment of the entire aggregate or the sand only greatly increases the water resistance of the mastic. These compositions contain only one-half the usual amount of asphalt to exaggerate the effects of the water exposure. Degradation of the mastics for field use would be much slower.

While the invention has been described in detail and with reference to specific embodiments, it will be obvious other variations and embodiments can be effected within the spirit and scope of the appended claims.

We claim:

1. A surfacing composition comprising (A) 100 parts by weight of a mineral aggregate, (B) 3 to 20 parts by weight of an asphalt and (C) from 0.0001 to 0.10 parts by weight of a silane of the formula:

$$R^b - R^a - Si - X_3$$

wherein
1. X represents halogen or alkoxy,
2. $R^a$ represents alkylene, and
3. $R^b$ represents amino or aminoalkylene amino.

2. A composition of claim 1 wherein:
   a. X represents halogen or alkoxy containing 1 to 4 carbon atoms,
   b. $R^a$ represents an alkylene containing from 2 to 4 carbon atoms, and
   c. $R^b$ represents amino or aminoalkyleneamino containing 1 to 3 carbon atoms.

3. A composition of claim 2 wherein the components of said composition are intimately mixed.

4. A composition of claim 3 wherein:
   a. X represents chlorine, methoxy or ethoxy,
   b. $R^a$ represents trimethylene, and
   c. $R^b$ represents amino or aminoethylene amino.

5. A surfacing composition of claim 3 wherein said silane is aminoethyleneaminopropyl trimethoxy silane.

6. A composition comprising an asphalt and about 0.001 to about 1.0 percent weight of a silane of the formula:

$$R^b - R^a - Si - X_3$$

wherein
1. X represents halogen or alkoxy,
2. $R^a$ represents alkylene, and
3. $R^b$ represents amino or aminoalkylene amino.

7. A composition of claim 6 wherein:
   a. X represents halogen or alkoxy containing 1 to 4 carbon atoms,
   b. $R^a$ represents an alkylene containing from 2 to 4 carbon atoms, and
   c. $R^b$ represents amino or aminoalkylene amino containing 1 to 3 carbon atoms.

8. A composition of claim 7 wherein:
   a. X represents chlorine, methoxy or ethoxy,
   b. $R^a$ represents trimethylene, and
   c. $R^b$ represents amino or aminoethylene amino.

9. An asphalt composition having a high adhesion strength, comprising road-paving asphalt having mixed therein from 0.0005 to 3.33% by weight, based on the amount of asphalt, of an aminoalkyl polyalkoxysilane having the formula:

$$R^b - R^a - Si - X_3$$

wherein
1. X represents alkoxy,
2. $R^a$ represents alkylene, and
3. $R^b$ represents amino or aminoalkylene amino.

10. An asphalt composition according to claim 9, in which said aminoalkyl polyalkoxysilane is selected from the group consisting of β-aminoethyl-γ-aminopropyl trimethoxysilane, and γ-aminopropyl triethoxysilane.

11. A method for preparing asphalt having a high adhesion strength, which comprises incorporating in roadpaving asphalt from 0.0005 to 3.33 percent by weight, based on the amount of asphalt, of an aminoalkyl polyalkoxysilane having the formula:

$$R^b - R^a - Si - X_3$$

wherein
1. X represents alkoxy,
2. $R^a$ represents alkylene, and
3. $R^b$ represents amino or aminoalkylene amino.

* * * * *